H. GEILHAUSEN.
Candy Cigar Machine.
No. 49,515.  Patented Aug. 22, 1865.
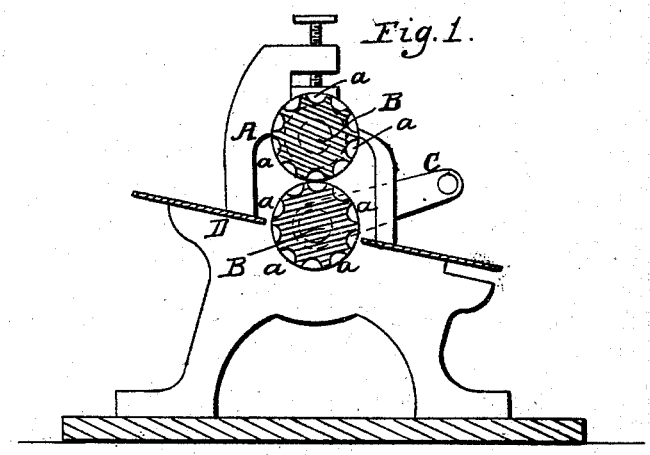
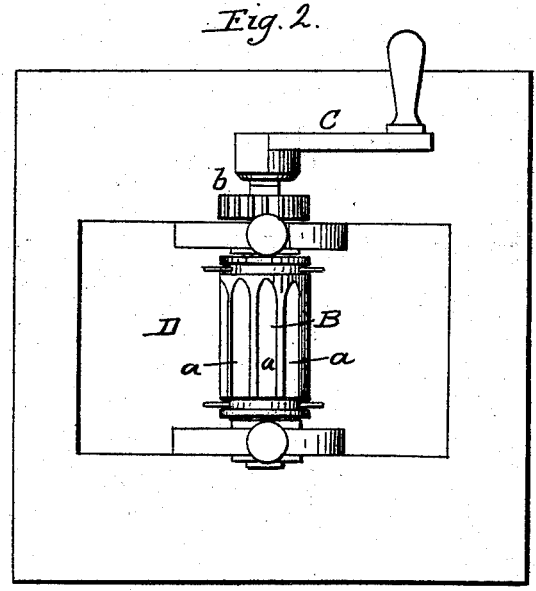

UNITED STATES PATENT OFFICE.

HENRY GEILHAUSEN, OF NEW YORK, N. Y.

CANDY-CIGAR MACHINE.

Specification forming part of Letters Patent No. 49,515, dated August 22, 1865.

*To all whom it may concern:*

Be it known that I, HENRY GEILHAUSEN, of the city, county, and State of New York, have invented a new and Improved Machine for Making Candy Cigars; and I do hereby declare that the following is a full, clear, and exact description thereof, which will enable others skilled in the art to make and use the same, reference being had to the accompanying drawings, forming part of this specification, in which—

Figure 1 represents a longitudinal vertical section of this invention. Fig. 2 is a plan or top view of the same.

Similar letters of reference indicate like parts.

This invention consists in the use of two rollers, each of which is provided with a series of semi-cylindrical cavities or flutes, each representing the shape of one-half of a candy cigar, in combination with a suitable feed-table, and with end cutters working in annular grooves in both ends of the rollers in such a manner that by gearing the two rollers together and feeding the candy-paste through between them a large number of candy cigars are produced in a short time, all perfectly uniform and in the proper shape.

A represents a frame, of cast-iron or any other suitable material, the two side pieces of which form the guides for the journal-boxes of the rollers B B. These rollers are of equal diameter, and each is provided with a number of semi-cylindrical cavities, *a*, at equal distances apart, and all of uniform width and length, so that when the rollers are turned the cavities in one are exactly opposite to those in the other roller. Each cavity represents the shape of one-half of a candy cigar, and if two such cavities are opposite each other they form a mold for such a cigar. The two rollers are geared together by cog-wheels *b* of equal diameter, so that both revolve precisely at the same speed, a crank, C, being provided, which serves to impart motion to the same.

D is a feed-table, which is secured between the side pieces of the frame A in an inclined position, as clearly shown in Fig. 1 of the drawings, an opening being cut out to admit one of the rollers B. Over this table the candy-paste is fed to said rollers, and on passing through between them it fills the cavities *a* and is brought in the desired form of cigars. The ends of the cigars thus formed are trimmed off by knives *c*, which rise from the feed-table and work in suitable grooves, *d*, near the ends of the rollers B B. These knives form guides for the paste, whereby the operator is enabled to bring said paste to the proper part of the rollers, and all the surplus which is or may be squeezed out endwise while the cigars are being formed is cut off by said knives, and the cigars, on dropping from the cavities *a*, require no further hand-labor, and after they have been dried or baked they are ready for the market.

I claim as new and desire to secure by Letters Patent—

The end cutters, *c*, applied in combination with the rollers B B, which are provided with cavities *a*, and with the feed-table D, substantially as and for the purpose set forth.

The above specification of my invention signed by me this 28th day of June, 1865.

HENRY GEILHAUSEN.

Witnesses:
M. M. LIVINGSTON,
C. L. TOPLIFF.